United States Patent
Tooker et al.

(10) Patent No.: US 9,475,364 B2
(45) Date of Patent: Oct. 25, 2016

(54) SEALING SYSTEM FOR MOVABLE WINDOW OF REAR WINDOW ASSEMBLY

(71) Applicant: MAGNA MIRRORS OF AMERICA, INC., Holland, MI (US)

(72) Inventors: Troy F. Tooker, Allegan, MI (US); David K. Johnson, Holland, MI (US); Michael J. Hulst, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 4 days.

(21) Appl. No.: 14/510,353

(22) Filed: Oct. 9, 2014

(65) Prior Publication Data

US 2015/0101254 A1 Apr. 16, 2015

Related U.S. Application Data

(60) Provisional application No. 61/890,462, filed on Oct. 14, 2013.

(51) Int. Cl.
*B60J 1/18* (2006.01)
*B60J 10/00* (2016.01)
*B60J 1/00* (2006.01)

(52) U.S. Cl.
CPC ............... *B60J 1/1853* (2013.01); *B60J 1/007* (2013.01); *B60J 10/0017* (2013.01)

(58) Field of Classification Search
CPC .......... B60J 1/1853; B60J 10/04; B60J 1/16; B60J 10/0017; B60J 1/007; E05Y 2900/55
USPC ........... 49/413, 380, 125, 127, 479.1, 489.1, 49/495.1
See application file for complete search history.

(56) References Cited

U.S. PATENT DOCUMENTS

| | | |
|---|---|---|
| 957,728 A | 5/1910 | Bliss |
| 1,204,702 A | 11/1916 | Schupp |
| 2,762,675 A | 9/1956 | Janows |
| 2,858,408 A | 10/1958 | Barroero |
| 2,912,714 A | 11/1959 | Rich |
| 2,962,773 A | 12/1960 | Heller |
| 3,177,989 A | 4/1965 | Di Chiaro |
| 3,237,250 A | 3/1966 | Scoville |
| 3,379,859 A | 4/1968 | Marriott |
| 3,508,361 A | 4/1970 | Ryder |
| 3,715,707 A | 2/1973 | Anderson |
| 3,893,260 A | 7/1975 | Cadiou |
| 3,898,427 A | 8/1975 | Levin et al. |
| 3,911,245 A | 10/1975 | O'Shaughnessy |
| 3,964,068 A | 6/1976 | Torii et al. |
| 3,995,142 A | 11/1976 | Ciardelli et al. |
| 4,023,008 A | 5/1977 | Durussel |

(Continued)

*Primary Examiner* — Justin Rephann
(74) *Attorney, Agent, or Firm* — Gardner, Linn, Burkhart & Flory, LLP

(57) ABSTRACT

A slider window assembly for a vehicle includes a frame portion having an upper rail and a lower rail, with at least one fixed window panel fixed relative to the frame portion and defining an opening. A movable window panel is movable along the upper and lower rails between a closed position and an opened position. A perimeter seal is disposed at the at least one fixed window panel. The perimeter seal includes a single continuous sealing element that circumscribes the opening and that is configured to substantially seal against a surface of the movable window panel about a periphery of the movable window panel when the movable window panel is in its closed position.

18 Claims, 13 Drawing Sheets

(56) References Cited

U.S. PATENT DOCUMENTS

| | | |
|---|---|---|
| 4,065,848 A | 1/1978 | Dery |
| 4,081,926 A | 4/1978 | Jardin |
| 4,124,054 A | 11/1978 | Spretnjak |
| 4,137,447 A | 1/1979 | Boaz |
| 4,158,270 A | 6/1979 | Cherbourg et al. |
| 4,171,594 A | 10/1979 | Colanzi |
| 4,244,774 A | 1/1981 | Dery |
| RE30,663 E | 6/1981 | Schnitzius |
| 4,388,522 A | 6/1983 | Boaz |
| 4,410,843 A | 10/1983 | Sauer et al. |
| 4,415,196 A | 11/1983 | Baum et al. |
| 4,450,346 A | 5/1984 | Boaz |
| 4,458,445 A | 7/1984 | Sauer et al. |
| 4,519,443 A | 5/1985 | Sutoh et al. |
| 4,552,611 A | 11/1985 | Dery et al. |
| 4,606,159 A | 8/1986 | Kunert |
| 4,611,849 A | 9/1986 | Trenker |
| 4,635,398 A | 1/1987 | Nakamura |
| 4,674,231 A | 6/1987 | Radek et al. |
| 4,723,809 A | 2/1988 | Kida et al. |
| 4,738,052 A | 4/1988 | Yoshida |
| 4,785,583 A | 11/1988 | Kawagoe et al. |
| 4,883,940 A | 11/1989 | Tokarz |
| 4,894,954 A * | 1/1990 | Nozaki ............... B60J 10/0017 49/373 |
| 4,920,698 A | 5/1990 | Friese et al. |
| 4,934,098 A | 6/1990 | Prouteau et al. |
| 4,970,911 A | 11/1990 | Ujihara et al. |
| 4,995,195 A | 2/1991 | Olberding et al. |
| 5,046,283 A | 9/1991 | Compeau et al. |
| 5,146,712 A | 9/1992 | Hlavaty |
| 5,228,740 A | 7/1993 | Saltzman |
| 5,245,788 A | 9/1993 | Riegelman |
| 5,294,168 A | 3/1994 | Kronbetter |
| 5,308,247 A | 5/1994 | Dyrdek |
| 5,333,411 A | 8/1994 | Tschirschwitz et al. |
| 5,345,717 A | 9/1994 | Mori et al. |
| 5,363,596 A | 11/1994 | Kronbetter |
| 5,367,827 A | 11/1994 | Tajima et al. |
| 5,442,880 A | 8/1995 | Gipson |
| 5,466,911 A | 11/1995 | Spagnoli et al. |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,525,401 A | 6/1996 | Hirmer |
| 5,531,046 A | 7/1996 | Kollar et al. |
| 5,542,214 A | 8/1996 | Buening |
| 5,572,376 A | 11/1996 | Pace |
| 5,613,323 A | 3/1997 | Buening |
| 5,617,675 A | 4/1997 | Kobrehel |
| 5,711,112 A | 1/1998 | Barten et al. |
| 5,716,536 A | 2/1998 | Yokoto et al. |
| 5,724,769 A | 3/1998 | Cripe et al. |
| 5,724,771 A | 3/1998 | Gipson |
| 5,784,833 A | 7/1998 | Sponable et al. |
| 5,799,444 A | 9/1998 | Freimark et al. |
| 5,799,449 A | 9/1998 | Lyons et al. |
| 5,822,922 A | 10/1998 | Grumm et al. |
| 5,836,110 A | 11/1998 | Buening |
| 5,853,895 A | 12/1998 | Lewno |
| 5,890,321 A | 4/1999 | Staser et al. |
| 5,953,887 A | 9/1999 | Lucas et al. |
| 5,996,284 A | 12/1999 | Freimark et al. |
| 5,997,793 A | 12/1999 | Lahnala |
| 6,014,840 A | 1/2000 | Ray et al. |
| 6,026,611 A | 2/2000 | Ralston et al. |
| 6,038,819 A | 3/2000 | Klein |
| 6,086,138 A | 7/2000 | Xu et al. |
| 6,112,462 A | 9/2000 | Kolar |
| 6,119,401 A | 9/2000 | Lin et al. |
| 6,119,402 A | 9/2000 | Wisner |
| 6,125,585 A | 10/2000 | Koneval et al. |
| 6,161,894 A | 12/2000 | Chapman |
| 6,223,470 B1 | 5/2001 | Millard et al. |
| 6,225,904 B1 | 5/2001 | Jaffe et al. |
| 6,293,609 B1 | 9/2001 | Xu et al. |
| 6,324,788 B1 | 12/2001 | Koneval et al. |
| 6,328,243 B1 | 12/2001 | Yamamoto |
| 6,393,766 B2 * | 5/2002 | Nozaki ............... B60J 10/0017 49/475.1 |
| 6,490,832 B1 | 12/2002 | Fischbach et al. |
| 6,525,659 B2 | 2/2003 | Jaffe et al. |
| 6,591,552 B1 | 7/2003 | Rasmussen |
| 6,598,931 B2 | 7/2003 | Tamura |
| 6,691,464 B2 | 2/2004 | Nestell et al. |
| 6,742,819 B2 | 6/2004 | So et al. |
| 6,766,617 B2 | 7/2004 | Purcell |
| 6,783,171 B2 * | 8/2004 | Teishi ................. B60J 10/0017 296/146.9 |
| 6,955,009 B2 | 10/2005 | Rasmussen |
| 7,003,916 B2 | 2/2006 | Nestell et al. |
| 7,010,883 B2 | 3/2006 | Jaerpsten et al. |
| 7,014,251 B1 * | 3/2006 | Husk .................... B60P 3/36 277/630 |
| 7,051,478 B2 | 5/2006 | Bourque et al. |
| 7,073,293 B2 | 7/2006 | Galer |
| 7,155,863 B2 | 1/2007 | Daniel et al. |
| 7,184,190 B2 | 2/2007 | McCabe et al. |
| 7,186,118 B2 | 3/2007 | Hansen et al. |
| 7,219,470 B2 | 5/2007 | Lahnala |
| 7,255,451 B2 | 8/2007 | McCabe et al. |
| 7,259,359 B2 | 8/2007 | Davey et al. |
| 7,395,631 B2 | 7/2008 | Lahnala |
| 7,400,435 B2 | 7/2008 | Byers et al. |
| 7,437,852 B2 | 10/2008 | Dufour et al. |
| 7,608,949 B2 | 10/2009 | Busch |
| 7,626,749 B2 | 12/2009 | Baur et al. |
| RE41,502 E | 8/2010 | Neaux |
| 7,871,272 B2 | 1/2011 | Firman et al. |
| 7,900,863 B1 | 3/2011 | Cheng |
| 7,934,342 B2 | 5/2011 | Lahnala |
| 7,963,070 B2 | 6/2011 | Recker |
| 8,042,664 B2 | 10/2011 | Rutkowski et al. |
| 8,069,615 B2 | 12/2011 | Heiman et al. |
| 8,127,498 B2 | 3/2012 | Lahnala |
| 8,151,519 B2 | 4/2012 | Bello et al. |
| 8,250,812 B2 | 8/2012 | Hebert et al. |
| 8,272,168 B2 | 9/2012 | Lahnala |
| 8,402,695 B2 | 3/2013 | Smith et al. |
| 8,881,458 B2 | 11/2014 | Snider et al. |
| 8,915,018 B2 | 12/2014 | Snider |
| 2003/0074842 A1 | 4/2003 | Eckhardt et al. |
| 2003/0140562 A1 | 7/2003 | Staser et al. |
| 2003/0188487 A1 | 10/2003 | Rasmussen |
| 2003/0188490 A1 | 10/2003 | Kraus et al. |
| 2003/0213179 A1 | 11/2003 | Galer |
| 2004/0020131 A1 | 2/2004 | Galer et al. |
| 2004/0065017 A1 | 4/2004 | Priest et al. |
| 2004/0065018 A1 | 4/2004 | Regnier et al. |
| 2006/0032140 A1 | 2/2006 | Arimoto et al. |
| 2006/0061008 A1 | 3/2006 | Karner et al. |
| 2006/0107600 A1 | 5/2006 | Nestell et al. |
| 2006/0130405 A1 | 6/2006 | Hemond et al. |
| 2006/0175762 A1 * | 8/2006 | Barnett ................. B60J 1/1853 277/551 |
| 2007/0157522 A1 * | 7/2007 | Hebert .................. B60J 1/1853 49/413 |
| 2007/0209283 A1 | 9/2007 | Ostrowski et al. |
| 2007/0277443 A1 | 12/2007 | Dery et al. |
| 2008/0122262 A1 | 5/2008 | Cicala |
| 2008/0127563 A1 | 6/2008 | Tooker |
| 2008/0155902 A1 | 7/2008 | Kaiser |
| 2008/0202032 A1 | 8/2008 | Loidolt |
| 2009/0019778 A1 * | 1/2009 | Lahnala ................ B60J 1/1853 49/413 |
| 2009/0322705 A1 | 12/2009 | Halsey, IV |
| 2010/0107505 A1 * | 5/2010 | Schreiner ........... E05D 15/0608 49/413 |
| 2010/0122497 A1 * | 5/2010 | Lahnala ................ B60J 1/1853 49/413 |
| 2010/0146859 A1 | 6/2010 | Gipson et al. |
| 2010/0154312 A1 | 6/2010 | Gipson et al. |
| 2010/0182143 A1 | 7/2010 | Lynam |

(56) References Cited

U.S. PATENT DOCUMENTS

| | | |
|---|---|---|
| 2010/0240229 A1 | 9/2010 | Firman et al. |
| 2010/0263290 A1 | 10/2010 | Pawloski et al. |
| 2011/0030276 A1 | 2/2011 | Smith et al. |
| 2011/0233182 A1 | 9/2011 | Baranski |
| 2012/0091113 A1 | 4/2012 | Bennett et al. |
| 2012/0091114 A1 | 4/2012 | Ackerman et al. |
| 2012/0117880 A1 | 5/2012 | Lahnala et al. |
| 2012/0139289 A1 | 6/2012 | Lahnala |
| 2013/0174488 A1 | 7/2013 | Snider et al. |
| 2013/0255156 A1 | 10/2013 | Snider |
| 2013/0277352 A1 | 10/2013 | Degen et al. |
| 2013/0283693 A1 | 10/2013 | Huizen et al. |
| 2014/0047772 A1 | 2/2014 | Hulst |
| 2014/0091074 A1 | 4/2014 | Lisinski et al. |

* cited by examiner

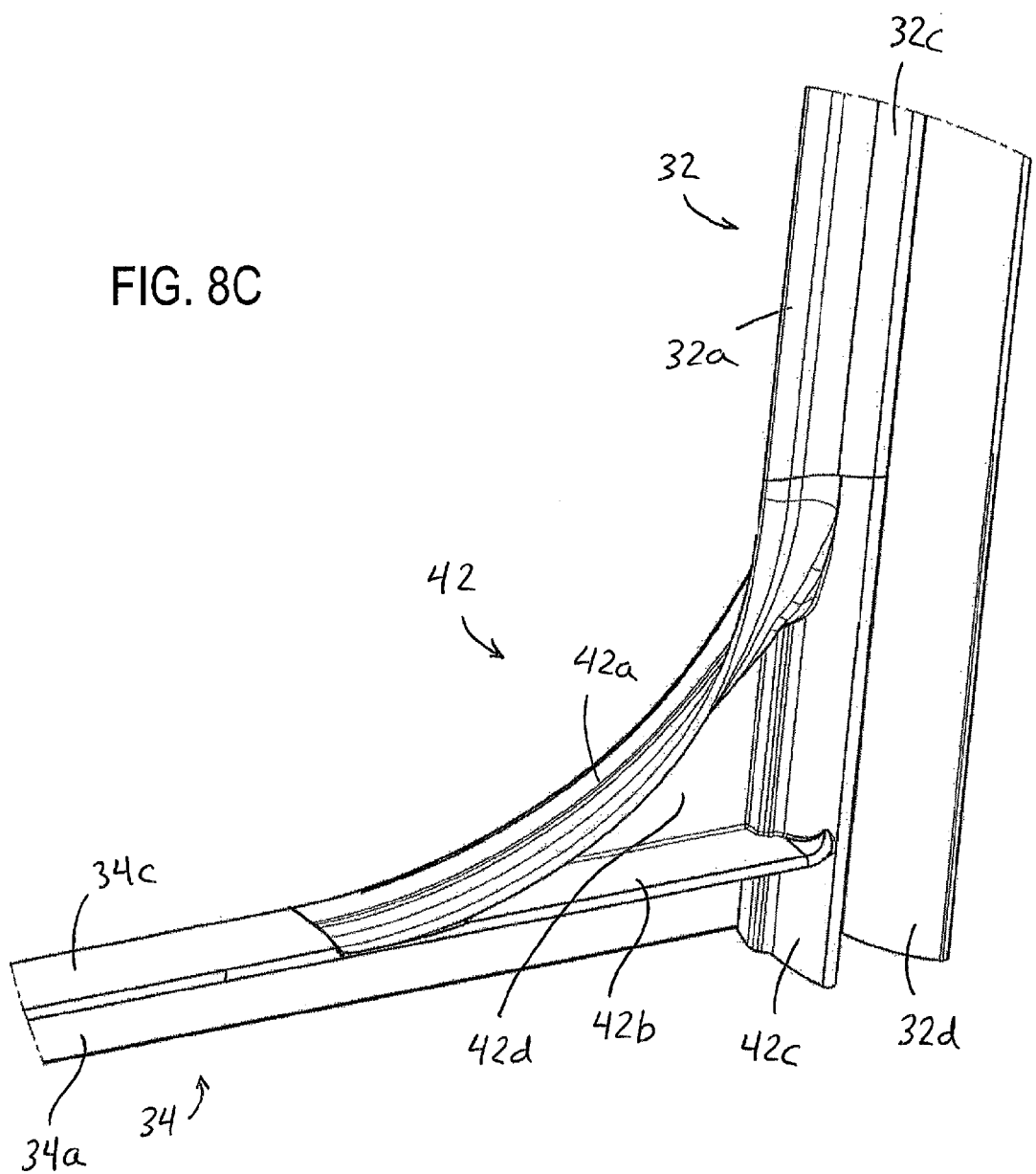

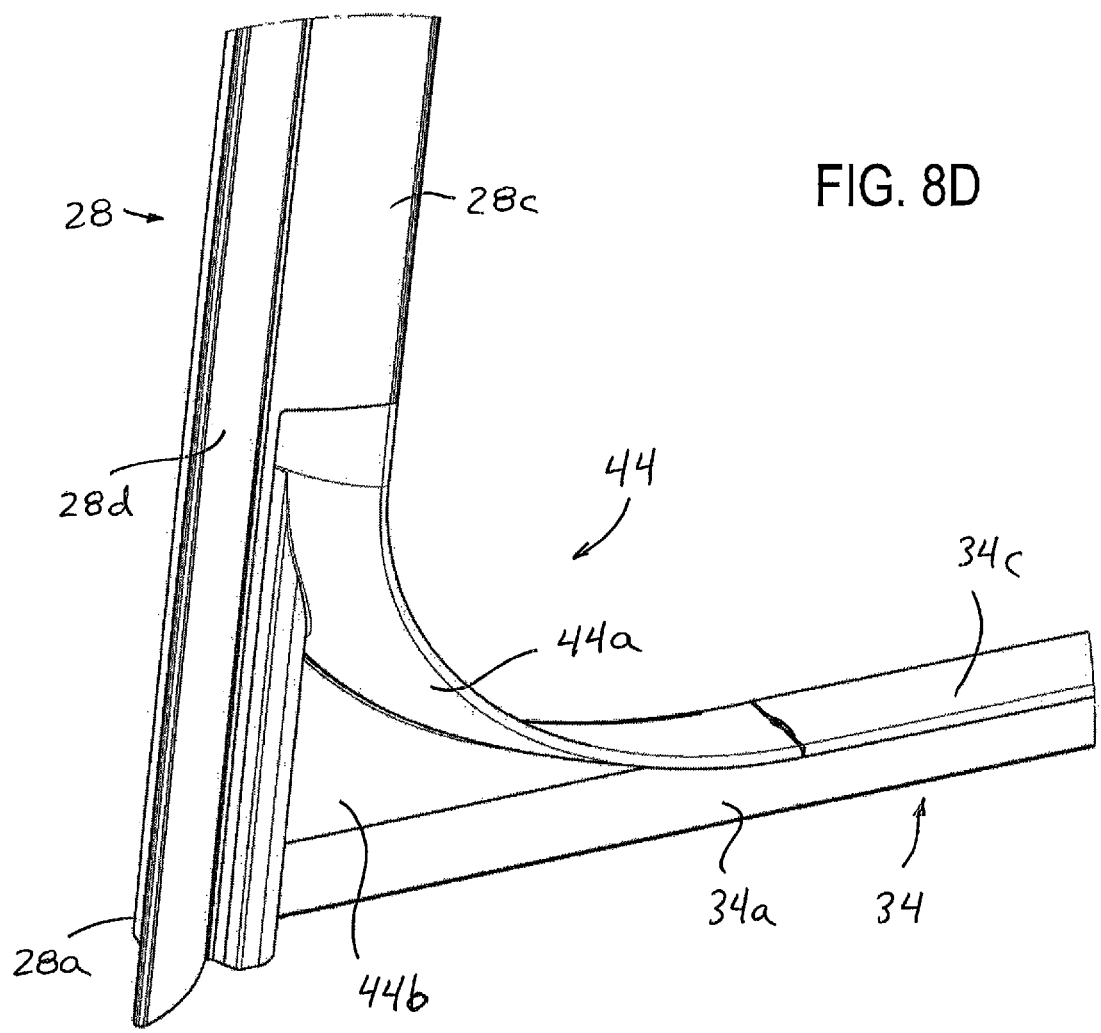

SEALING SYSTEM FOR MOVABLE WINDOW OF REAR WINDOW ASSEMBLY

CROSS REFERENCE TO RELATED APPLICATION

The present application claims the filing benefits of U.S. provisional application Ser. No. 61/890,462 filed Oct. 14, 2013, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. The slidable window panel may be driven or moved by a cable drive system.

SUMMARY OF THE INVENTION

The present invention provides a rear slider window assembly that has a unitarily formed perimeter seal for sealing the movable window panel relative to the fixed window panels when the movable window panel is closed. The perimeter seal comprises elongated sealing portions with corner sealing portions molded or formed at the adjacent ends of respective elongated sealing portions to form a continuous perimeter seal.

According to an aspect of the present invention, a rear slider window assembly of a vehicle (such as a pickup truck or the like) includes a frame portion having an upper rail and a lower rail. First and second spaced apart fixed window panels (or a single fixed window panel with an aperture formed therethrough) are fixed relative to the frame portion and define or establish an opening therebetween. A movable window panel is movable along the upper and lower rails and is movable between a closed position, where the movable window panel is disposed at the opening, and an opened position, where the movable window panel is disposed at least partially along the first fixed window panel. A unitarily formed or continuous perimeter seal is established at the fixed window panel or panels and around or circumscribing the opening. The seal is configured to slidingly and sealingly engage the surface of the movable window panel as the movable window panel moves between its opened and closed position and to substantially seal against the surface of the movable window panel when the movable window panel is closed over the opening, with the seal engaging the surface of the movable window panel about the periphery of the movable window panel.

The seal is formed as a continuous seal having an upper portion or leg, a lower portion or leg and opposite side portions or legs extending between and joining to the upper and lower portions or legs. Each seal portion or leg comprises an extruded seal having a selected configuration or shape, with the end regions of each seal portion or leg being joined to the end portions of adjacent seal portions or legs, such as via overmolding a corner seal portion or element at the adjacent or abutting end regions.

The unitary or continuous perimeter seal of the present invention thus provides a continuous seal about the opening of the window assembly and may be readily attached or adhered to the fixed window panel or panels during manufacture of the window assembly. The seal of the present invention comprises a continuous sealing element or seal that does not have separate pieces or gaps at the corners and thus provides for enhanced sealing at the movable window panel when the movable window panel is closed.

These and other objects, advantages, purposes and features of the present invention will become apparent upon review of the following specification in conjunction with the drawings.

BRIEF DESCRIPTION OF THE DRAWINGS

FIG. 8C is an enlarged perspective view of the area C in FIG. 8; and

FIG. 8D is an enlarged perspective view of the area D in FIG. 8.

DESCRIPTION OF THE PREFERRED EMBODIMENTS

Figure 1:
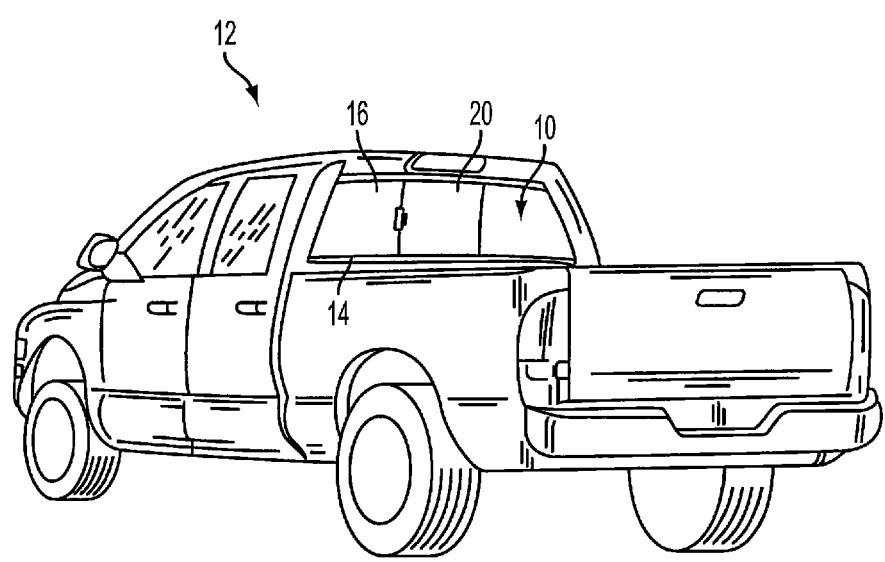
FIG. 1 is a rear perspective view of a pickup truck having a rear slider window assembly in accordance with the present invention.
Figure 2:
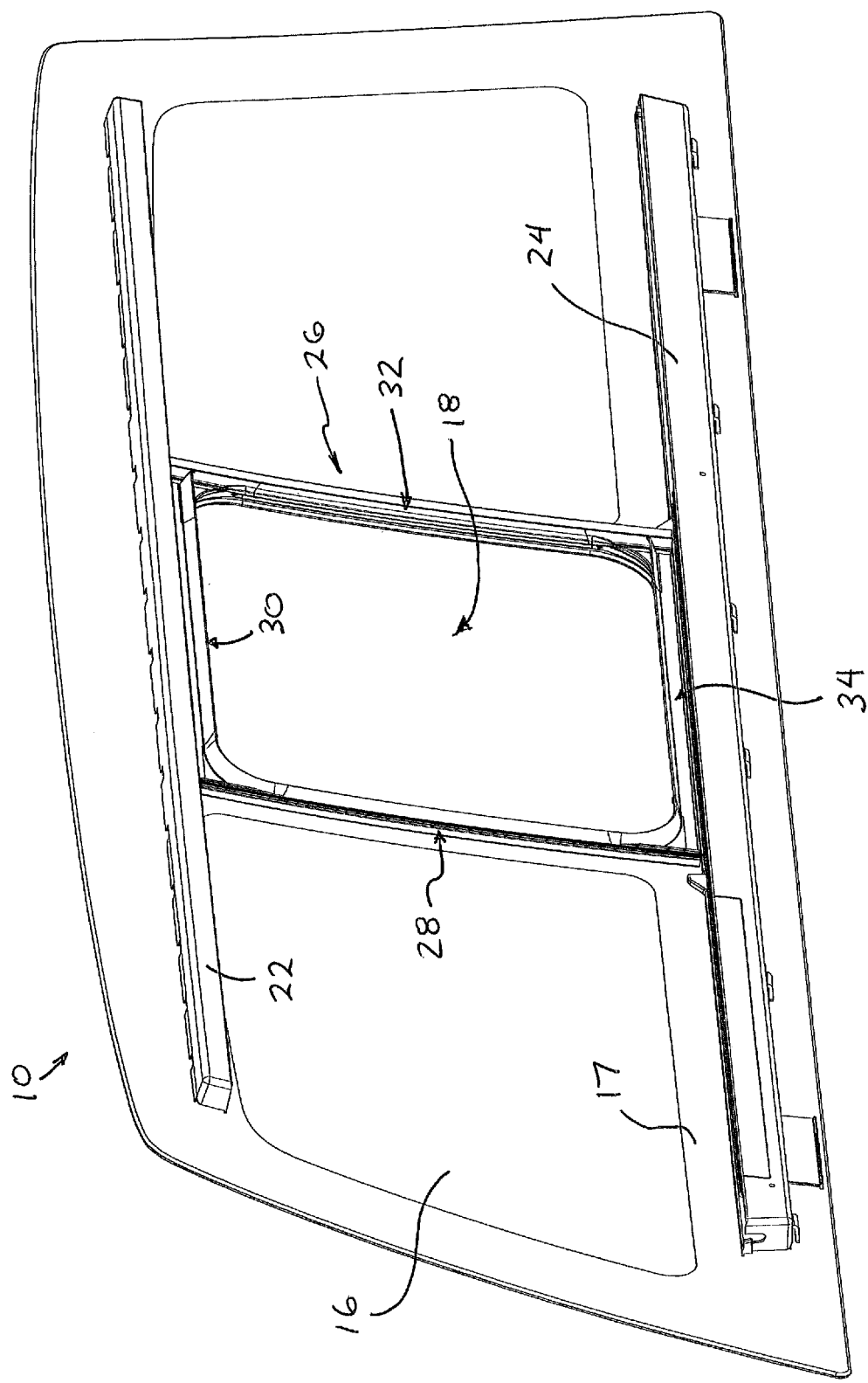
FIG. 2 is a perspective view of the rear slider window assembly having a window seal of the present invention, shown with the movable window panel removed.
Figure 3:
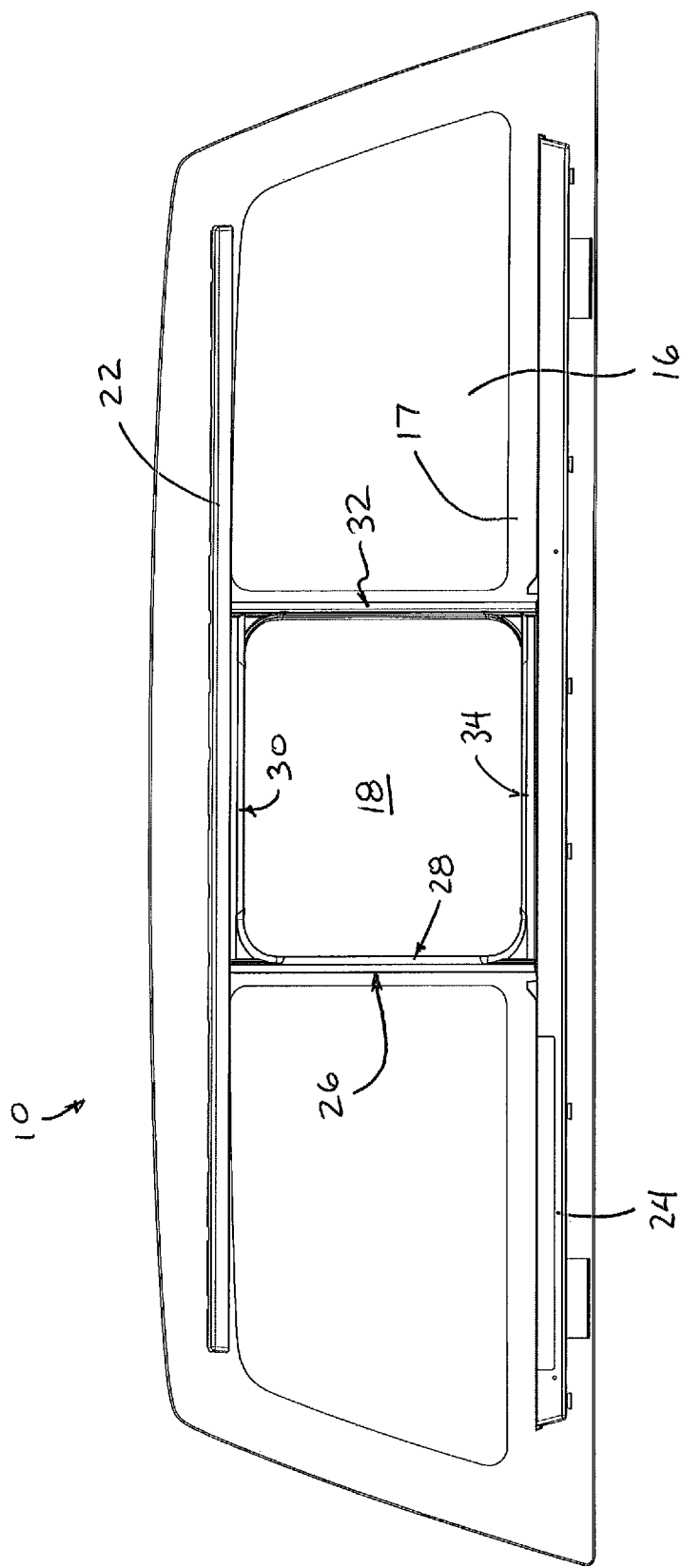
FIG. 3 is a plan view of the rear slider window assembly of FIG. 2.
Figure 4:
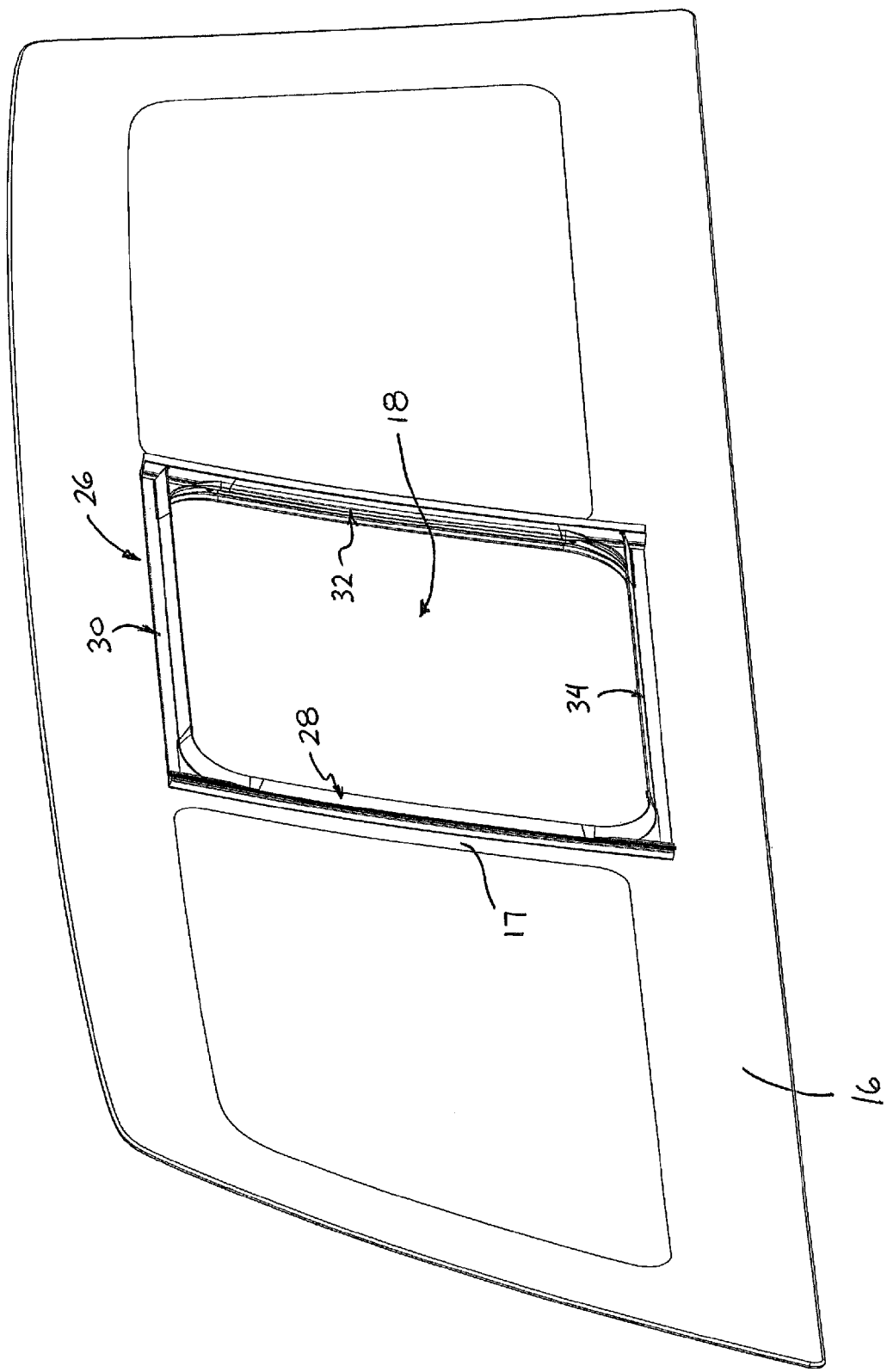
FIG. 4 is another perspective view of the rear slider window assembly of FIG. 2, shown with the upper and lower rails removed.
Figure 5:
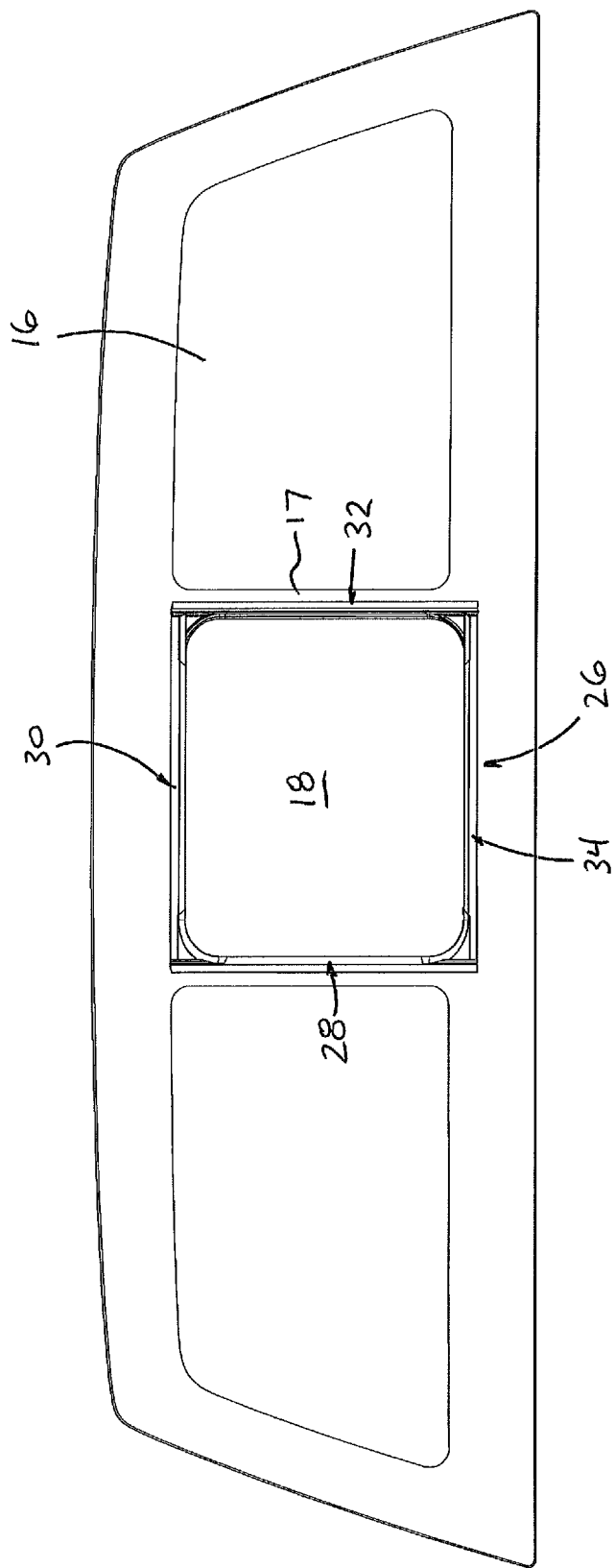
FIG. 5 is a plan view of the rear slider window assembly of FIG. 4.
Figure 6:
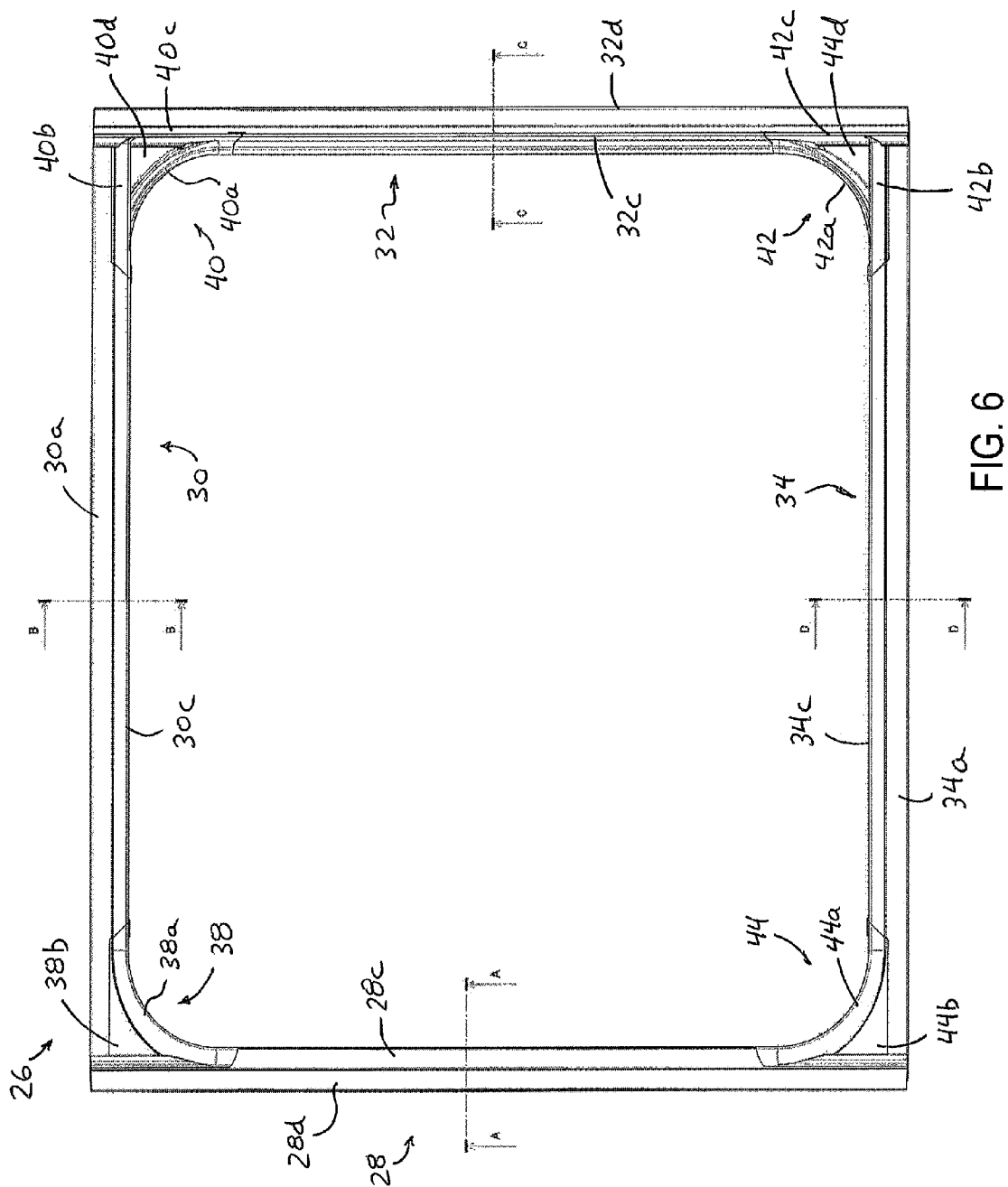
FIG. 6 is a plan view of the window seal of the present invention.
Figure 6A:
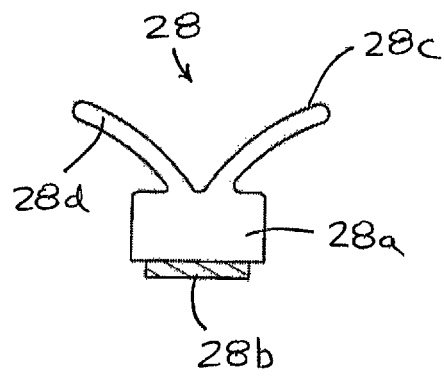
FIG. 6A is a sectional view of the window seal taken along the line A-A in FIG. 6.
Figure 6B:
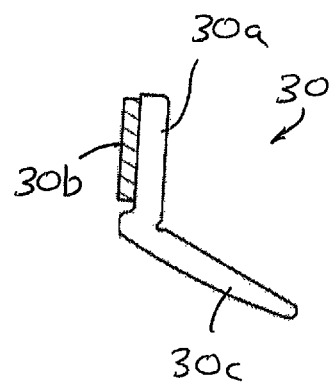
FIG. 6B is a sectional view of the window seal taken along the line B-B in FIG. 6.
Figure 6C:
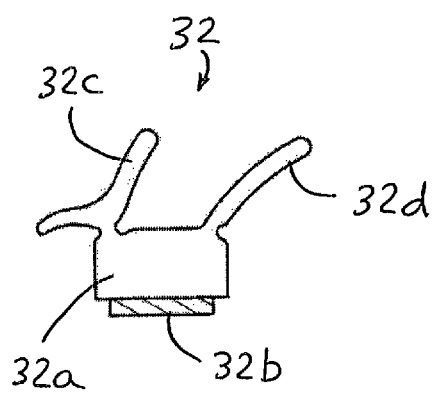
FIG. 6C is a sectional view of the window seal taken along the line C-C in FIG. 6.
Figure 6D:
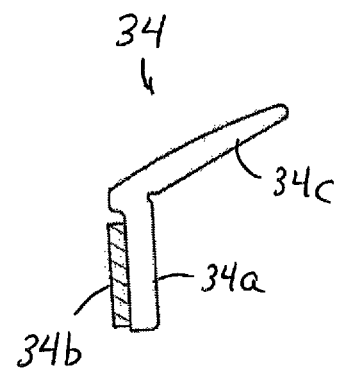
FIG. 6D is a sectional view of the window seal taken along the line D-D in FIG. 6.
Figure 7:
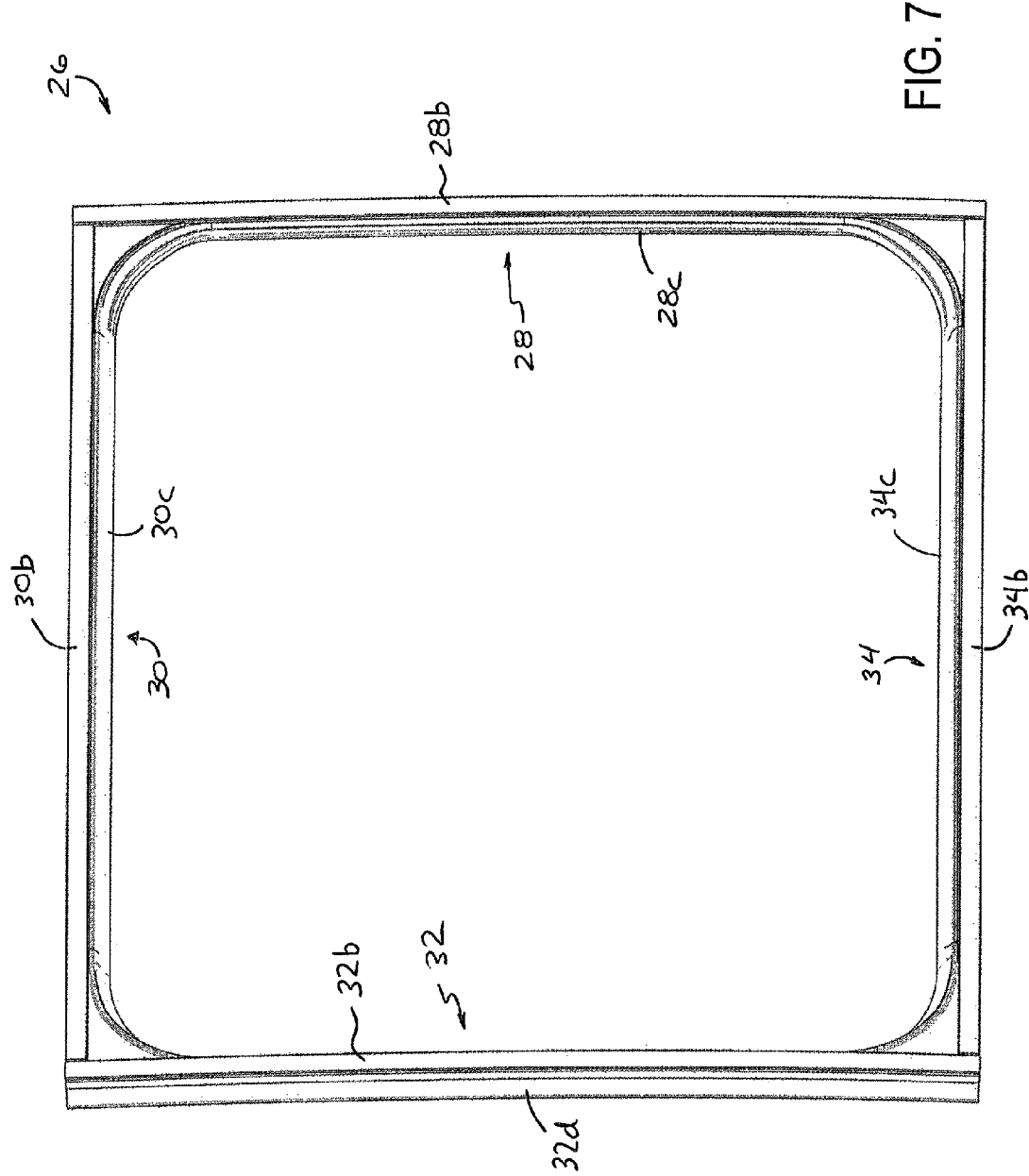
FIG. 7 is another plan view of the window seal of FIG. 6, as viewed from the opposite side of the seal as FIG. 6.

Referring now to the drawings and the illustrative embodiments depicted therein, a rear slider window assembly 10 of a vehicle 12 (such as a pickup truck or the like) includes a fixed window panel 16 (or a pair of side fixed window panels or fixed window panel portions) having an opening 18 established therethrough, and a movable window panel 20 that is movable relative to a frame or rails 22, 24 and fixed window panel 16 between an opened position and a closed position (FIGS. 1-3). The rails include an upper rail 22 and a lower rail 24, with the upper and lower edge regions of movable window panel 20 (FIG. 1) movably or slidably received in and along the respective upper and lower rails 22, 24. The window assembly 10 includes a perimeter seal 26 disposed at the fixed window panels and around window opening or aperture 18 established between the side panel portions of the fixed panel 16. When the movable window panel is closed, the perimeter seal 26 seals against a perimeter region of the surface of the movable window panel that faces the fixed window panel. The perimeter seal comprises a unitary continuous seal that is constructed via a two shot or multi-shot molding process, as discussed below.

In the illustrated embodiment, window assembly 10 comprises a hole-in-glass window configuration, where the single fixed glass panel has an aperture or hole or opening established therethrough to define separate spaced apart fixed window panels or panel portions. The window assembly may utilize aspects of the window assemblies described in U.S. Publication No. 2003-0213179, and/or such as in RE41502, and/or such as in International Publication Nos. WO2012/037190 and/or WO 2012/088287, which are all hereby incorporated herein by reference in their entireties. Optionally, the window assembly may comprise two fixed window panels or panel portions that are spaced apart so as to define an opening therebetween (and with upper and lower appliqués or trim or filler panels or elements disposed at the upper and lower regions of the opening and between the fixed window panels).

Upper and lower rails 22, 24 may comprise any suitable channel or rail element configured to slidably receive an upper or lower edge portion of the movable window panel. Slider or movable window panel 20 is movable along lower rail 24 and upper rail 22 of frame portion 14 to open and close the aperture or opening, such as in a manner similar to known slider window assemblies. The movable window panel 20 may include or may be disposed at a lower carrier, which may receive the lower perimeter edge region of the slider window panel 20 therein and is slidably or movably received in the channel portion of the lower rail 24 of frame portion 14.

The perimeter seal 26 comprises a continuous one-piece or unitarily formed seal having a first side leg or portion 28, an upper leg or portion 30, a second side leg or portion 32 and a lower leg or portion 34. Each of the sealing legs or portions 28, 30, 32, 34 has a respective elongated body portion or base portion 28a, 30a, 32a, 34a that has an attachment surface or element or portion 28b, 30b, 32b, 34b for attaching at the fixed window panel or panels and around the opening. For example, the attachment element may comprise an adhesive strip established along the body portion of the respective sealing leg for adhesively attaching the perimeter seal 26 to the fixed window panel around the opening (such as to portions of the fixed window panel that have a darkened or opaque or non-light-transmissive coating 17 established thereat). The perimeter seal thus may be adhered or otherwise attached to the surface of the fixed window panel (with the adhesive strip attached at the back of the elongated body portion and having a removable film or cover that is removed to expose the adhesive for attaching at the window panel) around the opening so as to circumscribe the opening or aperture (or, for two fixed window panel configurations, the perimeter seal may be adhered or otherwise attached to the surfaces of the fixed window panels and to the upper and lower appliqués so as to circumscribe the opening).

Each of the legs or portions 28, 30, 32, 34 of perimeter seal 26 has a respective seal configuration comprising a respective sealing lip 28c, 30c, 32c, 34c established along and formed or extruded with the base portion, as discussed in detail below. Also, each of the legs or seal portions 28, 30, 32, 34 has its end regions joined to adjacent end regions of adjacent ones of the other sealing legs or portions via a respective corner molding or seal portion 38, 40, 42, 44 having a curved seal or lip 38a, 40a, 42a, 44a that is molded with or to or over the end regions of the sealing lip 28c, 30c, 32c, 34c of the respective legs or portions 28, 30, 32, 34, as also discussed in detail below.

In the illustrated embodiment, the seal portions 28, 30, 32, 34 provide a desired sealing lip configuration for their particular application or position or orientation relative to the movable window panel. For example, seal portion 28 is at the side of the window opening at which the movable window panel will slide along as it is opened and closed, and thus may have a sealing lip configuration that seals against the window panel as it is moved in either direction, while seal portion 32 is at the side of the window opening at which the movable window panel will be moved to when it is closed, and thus may have a sealing lip configuration that is configured for engagement with the window panel during only small movement of the window panel, and the upper and lower seal portions 30, 34 are configured to seal against the surface of the window panel as the window panel moves in a longitudinal direction along the seal portions 30, 34.

As best shown in FIGS. 6, 6A, 8, 8A and 8D, seal portion 28 has a Y-shaped sealing lip configuration having an inner flexible lip 28c that flexes or curves away from an outer lip 28d and extends between respective corner curved seals or lips 38a and 42a, with the outer flexible lip 28d extending substantially the length of the seal portion 28. As best shown in FIGS. 6, 6C, 8, 8B and 8C, seal portion 32 has a double lip configuration having two flexible lips 32c, 32d that flex or curve in the closing direction of the movable window panel so that the lips 32c, 32d seal against the surface of the movable window panel as it is closed. As best shown in FIGS. 6, 6B, 8, 8A and 8B, the upper seal portion 30 comprises a single lip seal configuration having a single flexible sealing lip 30c that flexes towards the opening (such as in a downward direction for the upper seal portion 30) and slidably engages the upper perimeter region of the surface of the movable window panel as the panel moves between its opened and closed positions. Likewise, and as best shown in FIGS. 6, 6D, 8, 8C and 8D, the lower seal portion 34 comprises a single lip seal configuration having a single flexible sealing lip 34c that flexes towards the opening (such as in an upward direction for the lower seal portion 34) and slidably engages the lower perimeter region of the surface of the movable window panel as the panel moves between its opened and closed positions.

In the illustrated embodiment, and as best seen with reference to FIGS. 8A-D, The corner sealing portions 38, 40, 42, 44 are molded or overmolded or otherwise formed at the end regions of adjacent sealing legs or portions to provide a continuous sealing lip between the sealing lips of the adjacent sealing legs or portions. For example, and with reference to FIG. 8A, the inner lip 28c of sealing leg 28 is truncated or shortened or cut relative to the outer sealing lip 28d (which extends at least substantially the length of the sealing leg 28) at the upper end of the sealing leg, and the sealing lip 38a of corner sealing portion 38 is molded to or at the truncated end of inner lip 28c, while the sealing lip 30c of upper sealing leg 30 is truncated or shortened or cut relative to the length of the body 30a of the sealing leg 30, and the sealing lip 38a of corner sealing portion 38 is molded to or at the truncated end of inner lip 30c. The curved sealing lip 38a thus provides a curved continuous transition between the generally vertically oriented upper end of the side sealing lip 28c and the generally horizontally oriented end of the upper sealing lip 30c. The corner sealing portion 38 also includes a corner or base portion 38b that is partially overmolded over the body portions 28a, 30a of the sealing legs 28, 30 to substantially retain corner sealing portion 38 at the sealing legs 28, 30 and to substantially retain the sealing legs in the generally perpendicular arrangement or configuration relative to one another.

Similarly, and with reference to FIG. 8D, the inner lip 28c of sealing leg 28 is also truncated or shortened or cut relative to the outer sealing lip 28d at the lower end of the sealing leg 28, and the sealing lip 44a of corner sealing portion 44 is molded to or at the truncated end of inner lip 28c, while the sealing lip 34c of lower sealing leg 34 is truncated or shortened or cut relative to the length of the body 34a of the sealing leg 34, and the sealing lip 44a of corner sealing portion 44 is molded to or at the truncated end of inner lip 34c. The curved sealing lip 44a thus provides a curved continuous transition between the generally vertically oriented lower end of the side sealing lip 28c and the generally horizontally oriented end of the lower sealing lip 34c. The corner sealing portion 44 also includes a corner or base portion 44b that is partially overmolded over the body portions 28a, 34a of the sealing legs 28, 34 to substantially retain corner sealing portion 44 at the sealing legs 28, 34 and to substantially retain the sealing legs in the generally perpendicular arrangement or configuration relative to one another.

Figure 8:
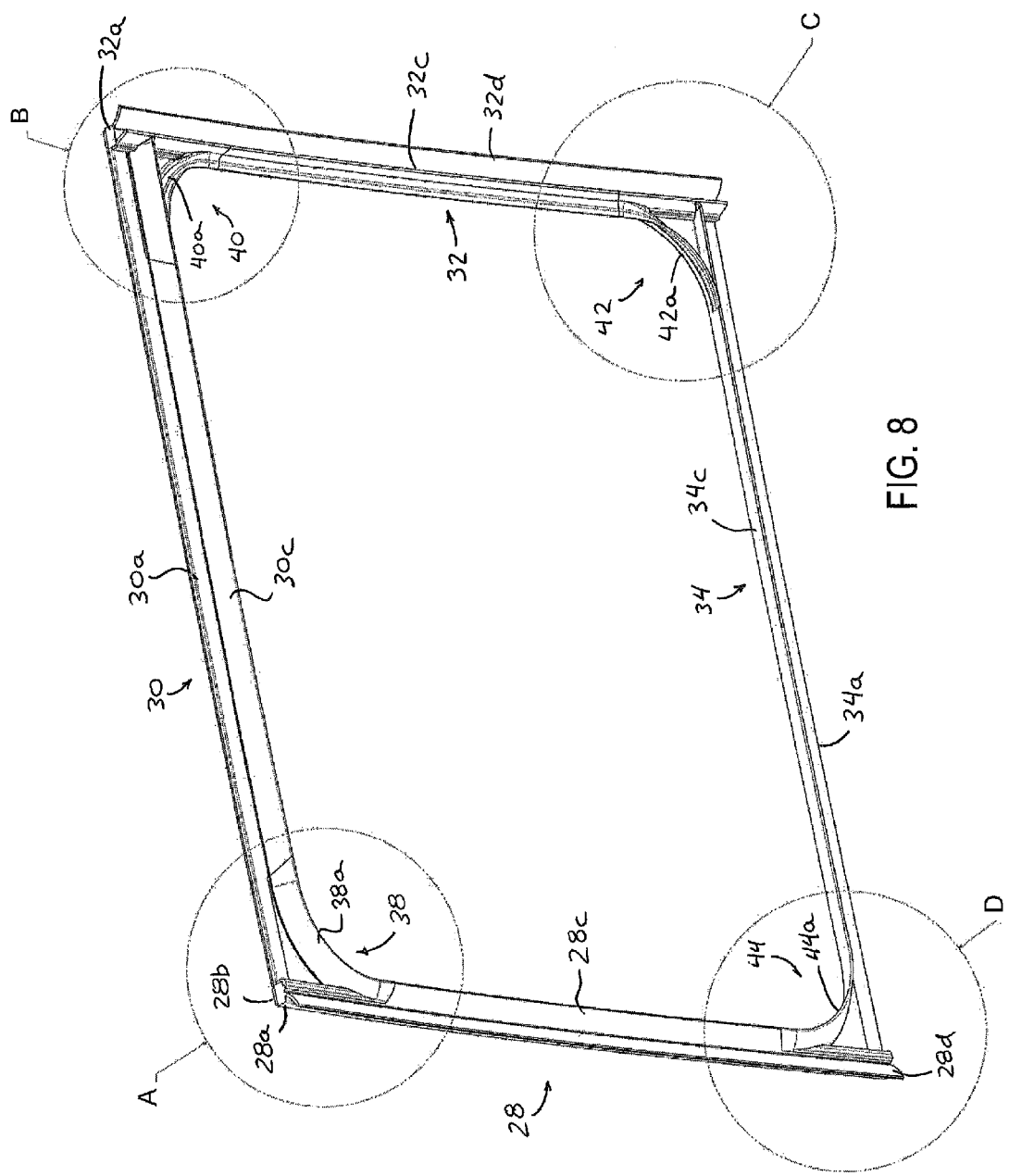
FIG. 8 is a perspective view of the window seal of FIG. 6.
Figure 8A:
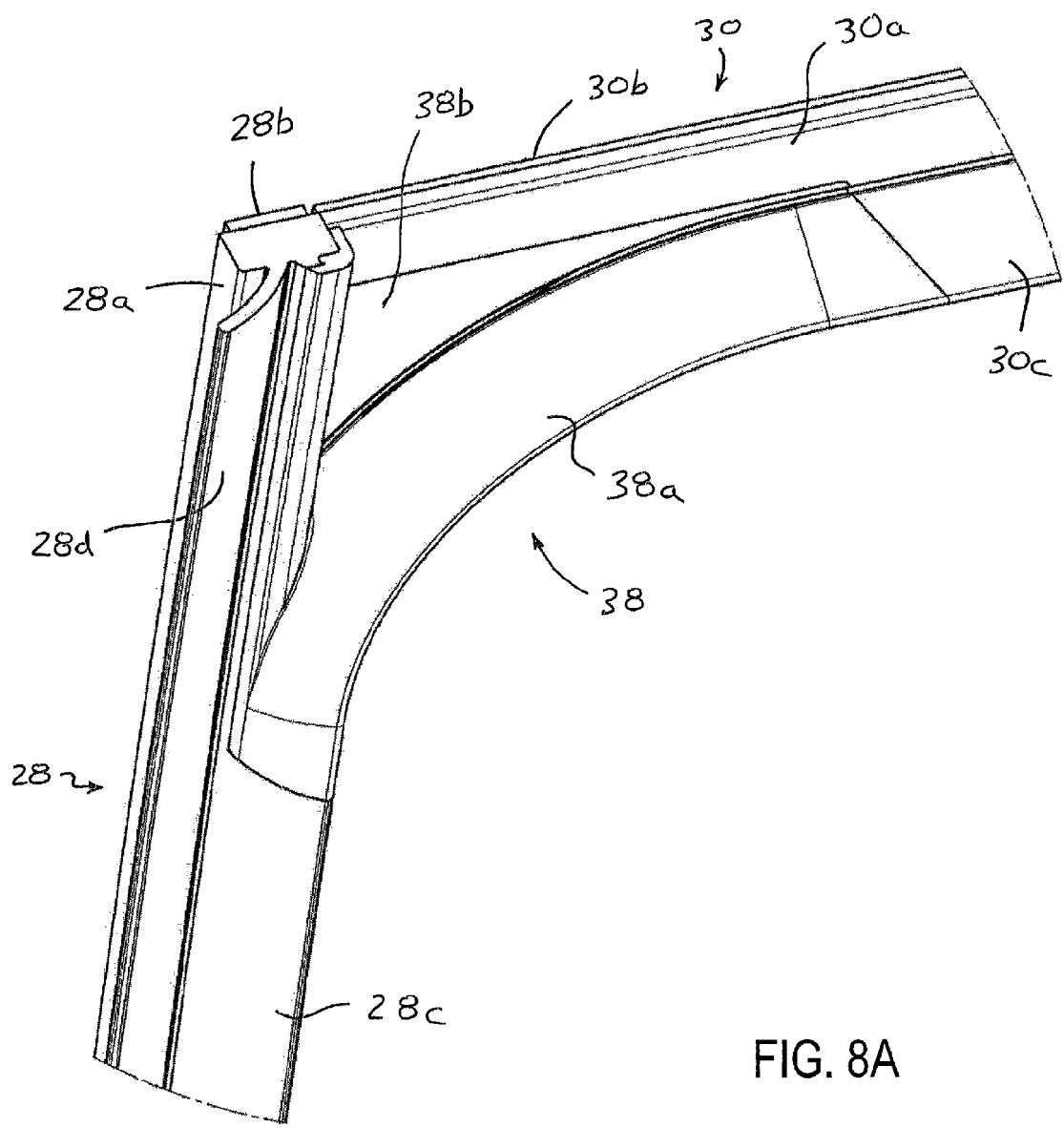
FIG. 8A is an enlarged perspective view of the area A in FIG. 8.
Figure 8B:
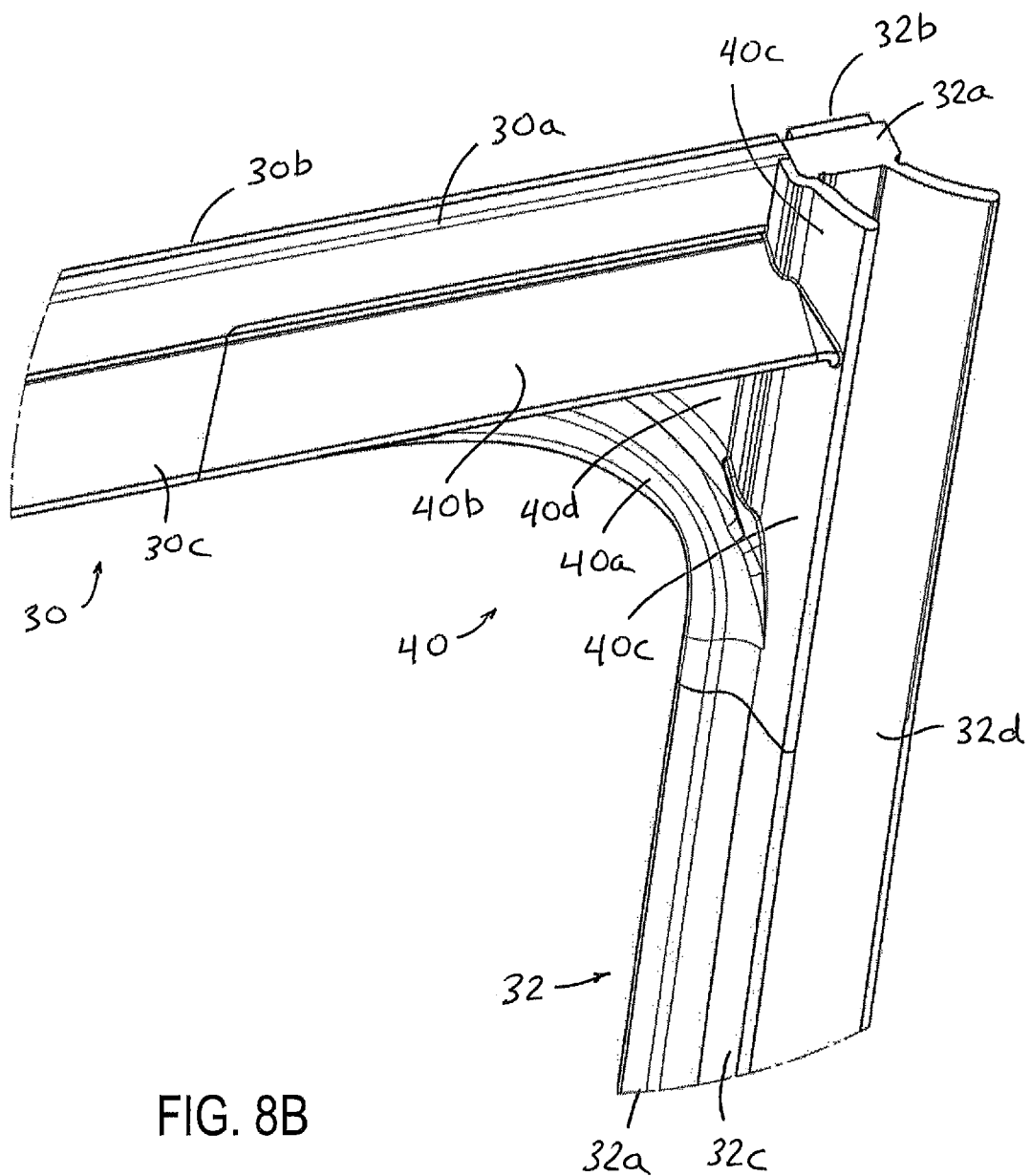
FIG. 8B is an enlarged perspective view of the area B in FIG. 8.

With respect to the corner sealing portion 40 at the junction of upper sealing leg 30 and side sealing leg 32, and as best shown in FIG. 8B, the sealing portion 40 includes a curved portion 40a and includes an upper sealing lip 40b and a side sealing lip 40c. As shown in FIG. 8B, the sealing lip 30c of upper sealing leg 30 is truncated or shortened or cut relative to the length of the body 30a of the sealing leg 30, and the inner sealing lip 32c of sealing leg 32 is truncated or shortened or cut relative to the outer sealing lip 32d and the body 32a of the sealing leg 32. The upper sealing lip 40b is molded to or formed at the end of the truncated sealing lip 30c of upper sealing leg 30, while the side sealing lip 40c is molded to or formed at the upper end of the truncated inner sealing lip 32c of side leg 32. In the illustrated embodiment, the sealing lips 40b, 40c are joined together to form a continuous seal at the corner region, while the curved portion 40a provides a partial seal and a curved continuous transition between the generally vertically oriented upper end of the side sealing leg 32 and the generally horizontally oriented end of the upper sealing leg 30. The corner sealing portion 40 also includes a corner or base portion 40d that is partially overmolded over the body portions 30a, 32a of the sealing legs 30, 32 to substantially retain corner sealing portion 40 at the sealing legs 30, 32 and to substantially retain the sealing legs in the generally perpendicular arrangement or configuration relative to one another.

Similarly, and as best shown in FIG. 8C, the corner sealing portion 42 includes a curved portion 42a and includes a lower sealing lip 42b and a side sealing lip 42c. As shown in FIG. 8C, the sealing lip 34c of lower sealing leg 34 is truncated or shortened or cut relative to the length of the body 34a of the sealing leg 34, and the inner sealing lip 32c of sealing leg 32 is truncated or shortened or cut relative to the outer sealing lip 32d and the body 32a of the sealing leg 32. The lower sealing lip 42b of corner sealing portion 42 is molded to or formed at the end of the truncated sealing lip 34c of lower sealing leg 34, while the side sealing lip 42c is molded to or formed at the lower end of the truncated inner sealing lip 32c of side leg 32. In the illustrated embodiment, the sealing lips 42b, 42c are joined together to form a continuous seal at the corner region, while the curved portion 42a provides a partial seal and a curved continuous transition between the generally vertically oriented lower end of the side sealing leg 32 and the generally horizontally oriented end of the lower sealing leg 34. The corner sealing portion 42 also includes a corner or base portion 42d that is partially overmolded over the body portions 32a, 34a of the sealing legs 32, 34 to substantially retain corner sealing portion 42 at the sealing legs 32, 34 and to substantially retain the sealing legs in the generally perpendicular arrangement or configuration relative to one another.

Thus, the perimeter seal of the present invention may be unitarily formed to provide a single, continuous perimeter seal about an opening of a rear slider window assembly (or other type of window assembly). The sealing legs may comprise extruded sealing elements that are extruded or otherwise formed of a flexible rubber material (or any suitable sealing material), and the corner sealing portions may be overmolded at the abutting ends or adjacent ends of the sealing legs. For example, the extruded sealing elements may be formed (and optionally the appropriate sealing lips may be cut back or shortened or truncated so as to not extend the full length of the sealing elements) and may be placed in a mold or mold cavity, so that the elongated body portions of the sealing legs abut one another at the corners of the perimeter seal (such as can be seen with reference to FIGS. 8A-D). The corner sealing portions may then be molded (such as via injection molded or the like) at and over the end portions of the abutted sealing legs to join the sealing legs and to form the curved sealing lip or portion and optionally the extended portions of the truncated or shortened or reduced sealing lips of the extruded sealing legs. When formed in this manner, the perimeter seal comprises a unitary perimeter seal that may be attached or adhered to the glass surface of the fixed window panel so that the perimeter seal provides a continuous sealing lip about its periphery and fully circumscribes the opening of the window with a continuous sealing lip. Thus, the present invention provides for enhanced sealing at the window seal with no gaps between sealing lips or elements arranged around the window opening.

The movable or slider window panel 20 is thus movable between its opened and closed positions and along the sealing elements, which maintain sealing engagement with the window panel as it moves along the rails 22, 24 of the window assembly. The movable window panel may be movable via any suitable means, such as via manual pushing or pulling at the window panel and/or in response to actuation of a drive motor of a drive motor assembly or system, which may move cables or wires of cable assemblies relative to a sheath of the cable assemblies or the like to impart horizontal movement of the slider window panel 20 along the rails 22, 24. Optionally, the drive motor assembly may utilize aspects of the drive assemblies of the types described in U.S. Pat. Nos. 4,920,698; 4,995,195; 5,146,712; 5,531,046; 5,572,376; 6,955,009 and/or 7,073,293, and/or U.S. Publication Nos. 2004-0020131 and/or 2008-0127563, which are all hereby incorporated herein by reference in their entireties.

The benefits of embodiments of the slider window assembly of the present invention may also be realized in vehicular movable window assemblies other than a rear slider window assembly for a pickup truck or the like, such as (for example) a slider window assembly suitable for use as a movable side window for a vehicle such as a van or a bus. The window assembly may utilize aspects of the elements and window assemblies described in International Publication Nos. WO2012/037190 and/or WO 2012/088287, which are hereby incorporated herein by reference in their entireties.

Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Optionally, the fixed window panel and movable window panel of the window assembly of the present invention may include one or more electrically conductive elements, such as heater grids or the like, which may be powered utilizing aspects of the window assemblies described in U.S. Pat. No. 8,402,695 and/or International Publication No. WO2012/037190, which are hereby incorporated herein by reference in their entireties. The window assembly may include a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions, such as by utilizing aspects of the window assemblies described in U.S. Pat. No. 8,402,695 and/or International Publication No. WO2012/037190, incorporated above.

Optionally, the window assembly or assemblies of the present invention may utilize aspects of the window assemblies described in U.S. Pat. Nos. 8,402,695; 7,073,293; 7,003,916; 6,119,401; 6,026,611; 5,996,284; 5,799,444 and/or 6,691,464, and/or U.S. Publication Nos. 2006-0107600; 2008-0127563; 2004-0020131 and/or 2003-0213179, and/or International Publication Nos. WO2012/037190; WO 2012/088287 and/or WO 2012/148968, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A slider window assembly for a vehicle, said slider window assembly comprising:
    a frame portion having an upper rail and a lower rail;
    at least one fixed window panel that is fixed relative to said frame portion, said at least one fixed window panel defining an opening;
    a movable window panel that is movable along said upper rail and said lower rail, wherein said movable window panel is movable between a closed position, where said movable window panel is disposed at said opening, and an opened position, where said movable window panel is disposed at least partially along said at least one fixed window panel;
    a perimeter seal disposed at said at least one fixed window panel, wherein said perimeter seal comprises a single continuous sealing element that circumscribes said opening and that is configured to substantially seal against a surface of said movable window panel about a periphery of said movable window panel when said movable window panel is in its closed position;
    wherein said perimeter seal comprises an elongated upper sealing portion, an elongated lower sealing portion, a first elongated side sealing portion and a second elongated side sealing portion, and wherein corner sealing portions are established between adjacent ends of said elongated sealing portions;
    wherein said elongated upper sealing portion, said elongated lower sealing portion, said first elongated side sealing portion and said second elongated side sealing portion are separately formed from one another;
    wherein said corner sealing portions are molded at said adjacent ends of said separately formed elongated sealing portions to join the separately formed elongated sealing portions and to provide a continuous sealing lip between sealing lips of the joined adjacent elongated sealing portions;
    wherein said corner sealing portions comprise a body portion that is molded partially over body portions of adjacent elongated sealing portions to join and retain said elongated sealing portions relative to one another; and
    wherein said continuous sealing lip of at least some of said corner sealing portions extends from the respective body portion and comprises an arcuate shaped sealing lip providing a curved transition between said sealing lips of the adjacent elongated sealing portions.

2. The slider window assembly of claim 1, wherein said elongated upper sealing portion, said elongated lower sealing portion, said first elongated side sealing portion and said second elongated side sealing portion comprise extruded sealing portions.

3. The slider window assembly of claim 1, wherein one of said elongated sealing portions comprises a Y-shaped sealing lip having an outer lip and an inner lip closer to said opening than said outer lip, and wherein said continuous sealing lip of said corner sealing portions at opposite ends of said one of said elongated sealing portions comprises an arcuate shaped single sealing lip that provides a curved transition between said inner lip of said Y-shaped sealing lip and another sealing lip of an adjacent elongated sealing portion that is adjacent to a respective one of the ends of said one of said elongated sealing portions.

4. The slider window assembly of claim 3, wherein said inner lip of said Y-shaped sealing lip is truncated so as to not extend to the ends of said one of said elongated body portions, and wherein said curved sealing lips of said corner sealing portions provide a continuous sealing lip between truncated ends of said inner sealing lip and respective ends of the adjacent elongated sealing portions.

5. The slider window assembly of claim 1, wherein one of said elongated sealing portions comprises a double sealing lip having an outer lip and an inner lip closer to said opening than said outer lip, and wherein said continuous sealing lip of said corner sealing portions at opposite ends of said one of said elongated sealing portions comprises an arcuate shaped single sealing lip that provides a curved transition between said inner lip of said double sealing lip and another sealing lip of an adjacent elongated sealing portion that is adjacent to a respective one of the ends of said one of said elongated sealing portions.

6. The slider window assembly of claim 1, wherein said each of said elongated sealing portions comprises an elongated body and a sealing lip extending substantially along said elongated body, and wherein said sealing lip is truncated so as to not extend to the ends of said elongated body, and wherein said corner sealing portions are established at said adjacent ends of said elongated sealing portions to provide a continuous sealing lip between truncated sealing lips of the adjacent elongated sealing portions.

7. The slider window assembly of claim 1, wherein said at least one fixed window panel comprises a single fixed window panel having said opening therethrough.

8. The slider window assembly of claim 7, wherein said perimeter seal is adhesively attached at a surface of said single fixed window panel around said opening.

9. The slider window assembly of claim 1, wherein said at least one fixed window panel comprises first and second fixed window panels defining said opening therebetween.

10. The slider window assembly of claim 9, wherein said perimeter seal is adhesively attached at respective surfaces of said first and second fixed window panels and at respective surfaces of upper and lower appliqués so as to be attached around said opening.

11. A slider window assembly for a vehicle, said slider window assembly comprising:
a frame portion having an upper rail and a lower rail;
at least one fixed window panel that is fixed relative to said frame portion, said at least one fixed window panel defining an opening;
a movable window panel that is movable along said upper rail and said lower rail, wherein said movable window panel is movable between a closed position, where said movable window panel is disposed at said opening, and an opened position, where said movable window panel is disposed at least partially along said at least one fixed window panel;
a perimeter seal disposed at said at least one fixed window panel, wherein said perimeter seal comprises a single continuous sealing element that circumscribes said opening and that is configured to substantially seal against a surface of said movable window panel about a periphery of said movable window panel when said movable window panel is in its closed position;
wherein said perimeter seal comprises an elongated upper sealing portion, an elongated lower sealing portion, a first elongated side sealing portion and a second elongated side sealing portion;
wherein said elongated upper sealing portion, said elongated lower sealing portion, said first elongated side sealing portion and said second elongated side sealing portion comprise respective elongated body portions and sealing lips that extend substantially along said body portions;
wherein said elongated upper sealing portion, said elongated lower sealing portion, said first elongated side sealing portion and said second elongated side sealing portion are separately formed from one another;
wherein said perimeter seal comprises corner sealing portions established between adjacent ends of the separately formed elongated sealing portions to join the separately formed elongated sealing portions;
wherein each of said corner sealing portions comprises a body portion that is molded partially over said body portions of respective adjacent elongated sealing portions to join and retain the respective elongated sealing portions relative to one another; and
wherein each of said corner sealing portions comprises a curved sealing lip that extends from said body portion and that extends between ends of said sealing lips of the respective adjacent elongated sealing portions joined by said corner sealing portion to provide a continuous sealing lip between said sealing lips of the respective adjacent elongated sealing portions.

12. The slider window assembly of claim 11, wherein said corner sealing portions are molded at said adjacent ends of the elongated sealing portions.

13. The slider window assembly of claim 11, wherein said sealing lips of the elongated sealing portions are truncated so as to not extend to the ends of said elongated body portions, and wherein said curved sealing lips of said corner sealing portions provide a continuous sealing lip between truncated ends of said sealing lips of the adjacent elongated sealing portions.

14. The slider window assembly of claim 11, wherein said at least one fixed window panel comprises a single fixed window panel having said opening therethrough, and wherein said perimeter seal is adhesively attached at a surface of said single fixed window panel around said opening.

15. The slider window assembly of claim 11, wherein said at least one fixed window panel comprises first and second fixed window panels defining ai said opening therebetween, and wherein said perimeter seal is adhesively attached at respective surfaces of said first and second fixed window panels and at respective surfaces of upper and lower appliqués so as to be attached around said opening.

16. The slider window assembly of claim 11, wherein one of said elongated sealing portions comprises a Y-shaped sealing lip having an outer lip and an inner lip closer to said opening than said outer lip, and wherein said continuous sealing lip of said corner sealing portions at opposite ends of said one of said elongated sealing portions comprises an arcuate shaped single sealing lip that provides a curved transition between said inner lip of said Y-shaped sealing lip and another sealing lip of an adjacent elongated sealing portion that is adjacent to a respective one of the ends of said one of said elongated sealing portions.

17. The slider window assembly of claim 16, wherein said inner lip of said Y-shaped sealing lip is truncated so as to not extend to the ends of said one of said elongated body portions, and wherein said curved sealing lips of said corner sealing portions provide a continuous sealing lip between truncated ends of said inner sealing lip and respective ends of the adjacent elongated sealing portions.

18. The slider window assembly of claim 11, wherein one of said elongated sealing portions comprises a double sealing lip having an outer lip and an inner lip closer to said opening than said outer lip, and wherein said continuous sealing lip of said corner sealing portions at opposite ends of said one of said elongated sealing portions comprises an arcuate shaped single sealing lip that provides a curved transition between said inner lip of said double sealing lip and another sealing lip of an adjacent elongated sealing portion that is adjacent to a respective one of the ends of said one of said elongated sealing portions.

* * * * *

UNITED STATES PATENT AND TRADEMARK OFFICE
CERTIFICATE OF CORRECTION

| | |
|---|---|
| PATENT NO. | : 9,475,364 B2 |
| APPLICATION NO. | : 14/510353 |
| DATED | : October 25, 2016 |
| INVENTOR(S) | : Tooker et al. |

It is certified that error appears in the above-identified patent and that said Letters Patent is hereby corrected as shown below:

In the Claims

Column 10
Line 29, "defining ai said" should be --defining said--

Signed and Sealed this
Twelfth Day of September, 2017

Joseph Matal
*Performing the Functions and Duties of the
Under Secretary of Commerce for Intellectual Property and
Director of the United States Patent and Trademark Office*